United States Patent
Lam et al.

(10) Patent No.: US 11,959,755 B2
(45) Date of Patent: Apr. 16, 2024

(54) VIRTUAL TILE ROUTING FOR NAVIGATING COMPLEX TRANSIT HUBS

(71) Applicant: The Regents of the University of California, Oakland, CA (US)

(72) Inventors: Jonathan Lam, Santa Cruz, CA (US); Fatemeh Mirzaei, Santa Cruz, CA (US); Roberto Manduchi, Santa Cruz, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 16/932,301

(22) Filed: Jul. 17, 2020

(65) Prior Publication Data

US 2021/0018321 A1      Jan. 21, 2021

Related U.S. Application Data

(60) Provisional application No. 62/875,163, filed on Jul. 17, 2019.

(51) Int. Cl.
G01C 21/34       (2006.01)
G01C 21/28       (2006.01)
G01C 21/36       (2006.01)

(52) U.S. Cl.
CPC ........ G01C 21/3423 (2013.01); G01C 21/28 (2013.01); G01C 21/3629 (2013.01); G01C 21/3664 (2013.01)

(58) Field of Classification Search
None
See application file for complete search history.

(56) References Cited

U.S. PATENT DOCUMENTS

| | | | |
|---|---|---|---|
| 8,983,494 B1* | 3/2015 | Onnen | H04W 4/02 |
| | | | 455/456.3 |
| 2006/0061586 A1* | 3/2006 | Brulle-Drews | A61B 3/066 |
| | | | 345/594 |

(Continued)

OTHER PUBLICATIONS

O. Czogalla and S. Naumann, "Pedestrian indoor navigation for complex public facilities," Oct. 2016, 2016 International Conference on Indoor Positioning and Indoor Navigation (IPIN), pp. 1-8, doi: 10.1109/IPIN.2016.7743672. (Year: 2016).*

(Continued)

*Primary Examiner* — Rachid Bendidi
*Assistant Examiner* — Selena M Jin
(74) *Attorney, Agent, or Firm* — GATES & COOPER LLP

(57) ABSTRACT

A computer implemented method or system for creating a route for navigating a transit hub or plaza using an application executing on a user's mobile device. The application accesses a tessellated map comprising first tiles each including a different area of interest on the map; and second tiles including a walkable area connecting the different areas of interest. The application highlights one of the first tiles including one of the different areas of interest selected using input from the user; highlights one of the second tiles including a location of the mobile device on the map; and highlights a series of the second tiles linking the location to the one of the areas of interest. A method of creating the tessellated map is also disclosed.

20 Claims, 9 Drawing Sheets

(56) References Cited

U.S. PATENT DOCUMENTS

| | | | | |
|---|---|---|---|---|
| 2010/0021013 | A1* | 1/2010 | Gale | G09B 29/00 |
| | | | | 382/113 |
| 2012/0066035 | A1* | 3/2012 | Stanger | H04W 4/18 |
| | | | | 705/14.1 |
| 2013/0325317 | A1* | 12/2013 | Pylappan | G01C 21/32 |
| | | | | 701/409 |
| 2014/0253577 | A1* | 9/2014 | Jang | G01C 21/32 |
| | | | | 345/589 |
| 2016/0055661 | A1* | 2/2016 | Li | H04W 4/33 |
| | | | | 345/593 |
| 2016/0356625 | A1* | 12/2016 | O'Beirne | G01C 21/3423 |
| 2016/0374045 | A1* | 12/2016 | Pandharipande | G01S 1/753 |
| 2017/0356742 | A1* | 12/2017 | Pung | G01C 21/206 |
| 2018/0330294 | A1* | 11/2018 | Anderson | G01C 21/3415 |

OTHER PUBLICATIONS

F. Cecelja, V. Garaj, Z. Hunaiti and W. Balachandran, "A Navigation System for Visually Impaired," 2006 IEEE Instrumentation and Measurement Technology Conference Proceedings, 2006, pp. 1690-1693, doi: 10.1109/IMTC.2006.328198. (Year: 2006).*

J. Kovanen, T. Sarjakoski, and L. Sarjakoski. 2013. A multi-modal communication approach to describing the surroundings to mobile users. In Proceedings of the 12th international conference on Web and Wireless Geographical Information Systems (W2GIS' 13). Springer-Verlag, Berlin, Heidelberg, (Year: 2013).*

Rehrl, Karl & Göll, Nicolas & Leitinger, Sven & Bruntsch, Stefan. Combined indoor/outdoor Smartphone navigation for public transport travellers. (2005). 235-249. (Year: 2005).*

Nikoohemat, Shayan. "Smart Campus Map." 2013. Technical University of Munich Faculty of Civil, Geo and Environmental Engineering Department of Cartography (Year: 2013).*

Kim, K.; Lee, K. Handling Points of Interest (POIs) on a Mobile Web Map Service Linked to Indoor Geospatial Objects: A Case Study. ISPRS Int. J. Geo-Inf. 2018, 7, 216. https://doi.org/10.3390/ijgi7060216 (Year: 2018).*

Meliones, A.; Sampson, D. Blind MuseumTourer: A System for Self-Guided Tours in Museums and Blind Indoor Navigation. Technologies 2018, 6, 4. https://doi.org/10.3390/technologies601000 (Year: 2018).*

* cited by examiner conventional mapping service conventional mapping conventional mapping conventional mapping

VIRTUAL TILE ROUTING FOR NAVIGATING COMPLEX TRANSIT HUBS

CROSS REFERENCE TO RELATED APPLICATIONS

This application claims the benefit under 35 U.S.C. Section 119(e) of U.S. Provisional Patent Application No. 62/875,163, filed Jul. 17, 2019, by Jonathan Lam, Fatemeh Mirzaei, and Roberto Manduchi, entitled "VIRTUAL TILE ROUTING FOR NAVIGATING COMPLEX TRANSIT HUBS," which application is incorporated by reference herein.

STATEMENT REGARDING FEDERALLY SPONSORED RESEARCH AND DEVELOPMENT

This invention was made with Government support under Grant No. PFI 1632158, awarded by the National Foundation Science. The Government has certain rights in the invention.

BACKGROUND OF THE INVENTION

1. Field of the Invention

The present invention relates to methods and systems for navigating complex transit hubs and plazas.

2. Description of the Related Art

Many travelers may be confused when moving in complex transit hubs, especially if they have visual or cognitive impairments. What is needed is a user friendly system with sufficiently small scale resolution to navigate within a transit hub. The present invention satisfies this need.

SUMMARY OF THE INVENTION

Embodiments of the systems illustrated herein define 'virtual tiles' that tessellate the walkable areas of complex transit hubs (e.g., multi-platform bus stops, train or light train stations) or plazas such as, but not limited to, shopping malls, marketplaces, and hospitals. A local route is then defined using these tiles. The traveler is tracked as he or she moves in the station, and is able to visualize his or her position in the tile route, or to hear verbal information about the tile he or she is located in (with respect to relevant landmarks) so that routing information is provided in verbal form.

Embodiments of the systems or methods described herein include, but are not limited to, the following.

1. A computer implemented system, comprising:
   one or more processors; one or more memories; and an application stored in the one or more memories, wherein the application executed by the one or more processors:
   accesses a tessellated map, the tessellated map comprising a plurality of tiles on a map of a transit hub or plaza, wherein the tiles comprise:
     first tiles, each of the first tiles including a different area of interest on the map; and
     second tiles, wherein a combination of the second tiles includes a walkable area connecting the areas of interest; and
   causes a display or a speaker of a mobile device coupled to the one or more processors to:
     indicate one of the first tiles including one of the different areas of interest selected using input from the user;
   indicate the one of the second tiles including a location of the mobile device on the map; and
   indicate a series of the second tiles linking the location to the one of the areas of interest.

2. The system of example 1, wherein the application requests input of the areas of interest comprising at least one area selected from a boarding area, a ticketing area, a ticket checking area, a crossing area, a shelter area, and an exit area.

3. The system of example 1, wherein:
   the application requests a destination served using a departure from a boarding area in the transit hub; and
   the one of the different areas of interest comprises the boarding area.

4. The system of example 3, wherein the application receives or determines the boarding area using data on a server computer coupled to the mobile device, the data comprising information on the boarding area associated with a transport route serving the destination from the transit hub.

5. The system of example 4, wherein the transport route is a bus route, a railway route, a taxi route, or a flight route.

6. The system of example 1, wherein the application indicates the one of second tiles including the location of the user as the user moves in relation to the one of the different areas of interest.

7. The system of example 1, wherein the application indicates the tiles on the display using a color.

8. The system of example 1, wherein the application indicates the tiles on the display using highlighting or a representation readable by the user comprising a visually impaired user.

9. The system of example 1, wherein the application causes the speaker of the mobile device to output:
   a verbal signal identifying the second tile including the user's current location with respect to a relevant landmark, and
   a verbal instruction providing a direction to the next tile in the series of the tiles leading to the area of interest.

10. The system of example 1, wherein the application sizes the tiles on the display to represent an area in the transit hub or plaza in a range of 1 foot by 1 foot to 10 feet by 10 feet.

11. The system of example 1, wherein the tiles are sized so that an entirety of the route is highlighted using the tiles on a display of the mobile device.

12. The system of example 1, wherein:
   the tiles comprise shapes or polygons, and
   the tessellated map comprises the tiles fitted together in a pattern on the map without gaps or overlapping between the tiles.

13. The system of example 1, wherein the application receives the location determined using a global positioning system (GPS) or a beacon signal received in the mobile device.

14. The system of example 12, further comprising the mobile device receiving the beacon signal transmitted from one of a plurality of transmitters in the transit hub or the plaza.

15. The system of example 1, wherein the application receives the tessellated map from a server computer in response to a request from the application executed on the mobile device.
16. The system of example 1, wherein:
the plaza comprises a shopping mall, a hospital, office buildings, or a factory, or
the transit hub comprises an airport, metro station, railway station, or bus station.
17. A computer implemented method, comprising:
creating a route for navigating a transit hub or plaza using an application executing on a user's mobile device, including:
accessing a tessellated map, the tessellated map comprising tiles on a map of a transit hub or a plaza, wherein the tiles comprise:
first tiles, each of the first tiles including a different area of interest on the map; and
second tiles, wherein a plurality of the second tiles include a walkable area connecting the different areas of interest;
indicating one of the first tiles including one of the different areas of interest selected using input from the user;
indicating one of the second tiles including a location of the mobile device on the map; and
indicating a series of the second tiles linking the location to the one of the different areas of interest.
18. The method of example 17, wherein the indicating comprises indicating the one of second tiles including the location of the user as the user moves in relation to the one of the different areas of interest.
19. The method of example 17, wherein the indicating comprises highlighting using a color.
20. The method of example 17, wherein the indicating comprises highlighting using a representation readable by the user comprising a visually impaired user.

BRIEF DESCRIPTION OF THE DRAWINGS

Referring now to the drawings in which like reference numbers represent corresponding parts throughout:

FIGS. 2C-2D are sample screenshots of a display taken during a test of the RouteMe2 application at the Diridon light rail, according to one or more embodiments of the present invention, wherein FIG. 2C shows the navigation system RouteMe2 defines a set of tiles and local route from the current user's location (green tile) to the correct boarding location (red tile) and FIG. 2D shows the local route is updated as the user moves.

FIG. 3D shows the local route is updated as the user moves.

DETAILED DESCRIPTION OF THE INVENTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Technical Description

The present disclosure describes a new functionality designed to help travelers navigate complex and/or confusing transit hubs or plaza. Embodiments of the present invention can be a standalone application or implemented as an add-on to existing transit applications (apps). Users of this technology include, but are not limited to, persons who have difficulties accessing the type of spatial information that is necessary for safe, independent travel. These may be people include persons with low vision or blindness, people with cognitive impairments, people who cannot speak English, or seniors. These travelers may have difficulties understanding which platform they should board a light rail on; finding the gate for rail crossing; or identifying the correct boarding location in bus hub with multiple stops.

First Example

Transit apps such as Google Maps™ normally define a single location (e.g., from the General Transit Feed Specification (GTFS) file provided by the agency) for a bus hub or for a train/light rail station. While this is useful for "getting there," conventional transit apps lack the fine-grain spatial information that is needed for successfully negotiating the trip.

Figure 1:
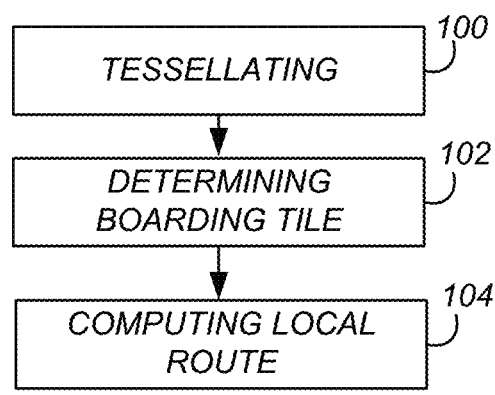
FIG. 1. Flowchart illustrating a method of navigating a transit hub, according to one or more embodiments of the present invention.

FIG. 1 illustrates an embodiment of the present invention (e.g., RouteMe2 technology) addressing the above described problems of the conventional art using the following steps.

Block 100 represents tessellating the walking areas of the transit station/bus hub with a number of tiles of appropriate size. In various examples, these tiles may have specific meanings (e.g., the boarding area for a bus stop), and may contain specific landmarks (e.g. a shelter, a Clipper card reader, a rail crossing area). In one or more embodiments, each tile is accompanied with a textual description for use by blind travelers. In one or more further embodiments, tiles are represented in Geo-JSON format and the phone app pulls this information from the cloud server when needed.

Figure 2A:
FIGS. 2A and 2B (enlarged view of FIG. 2A) are sample screen shots on a display showing a conventional mapping service only provides a generic starting location at the rail station.
Figure 2B:
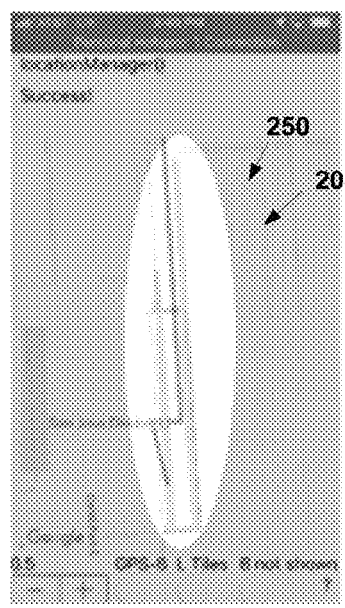
Figure 2C:
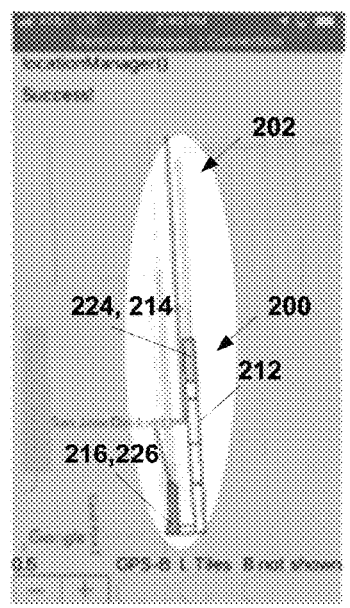
Figure 2D:
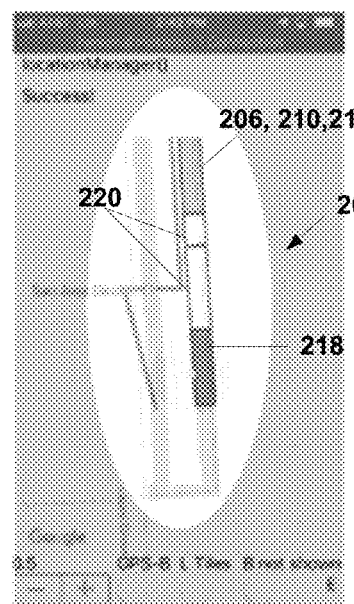
Figure 3A:
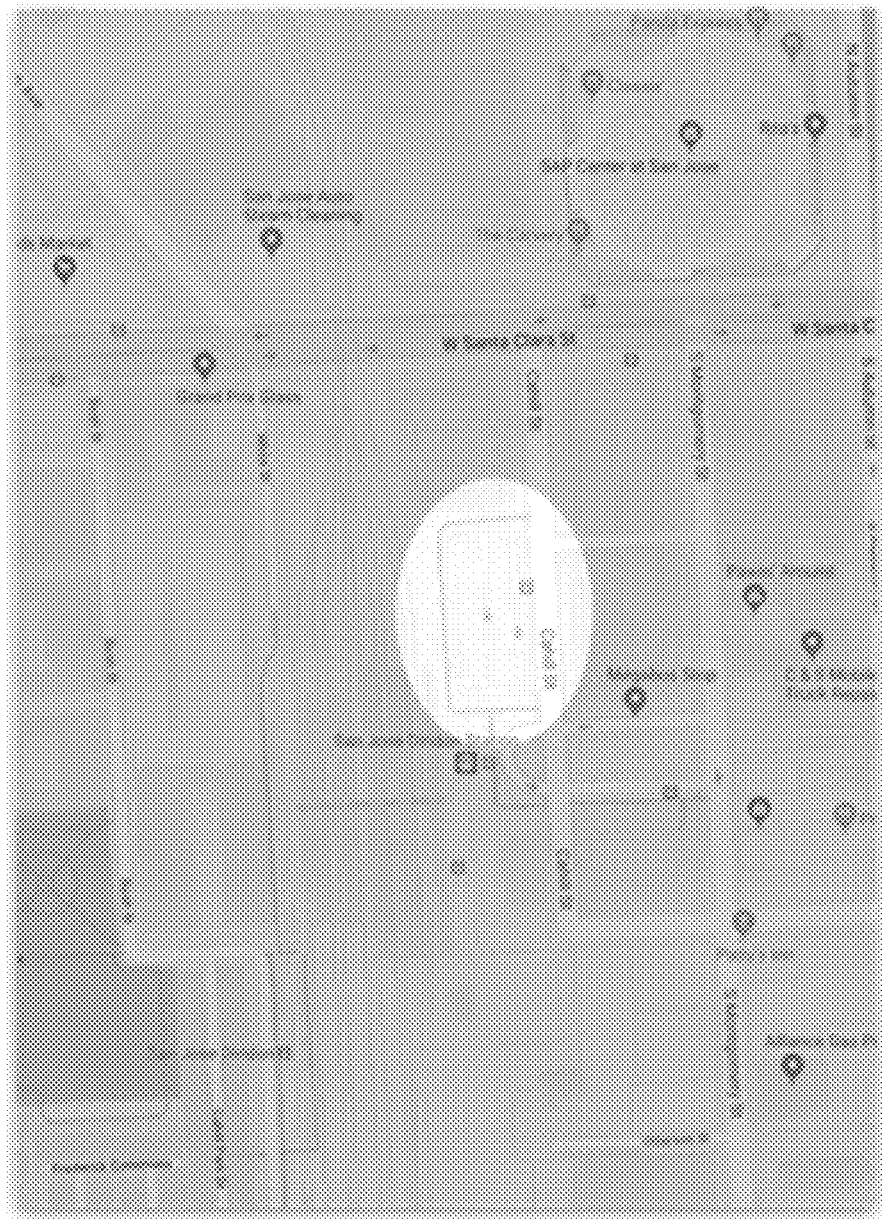
FIGS. 3A and 3B (enlarged view of FIG. 3A) are sample screen shots on a display showing a conventional mapping service only provides a generic starting location for a bus trip.
Figure 3B:
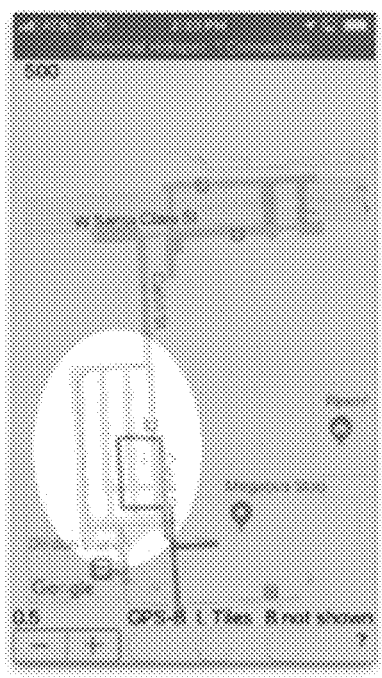
Figure 3C:
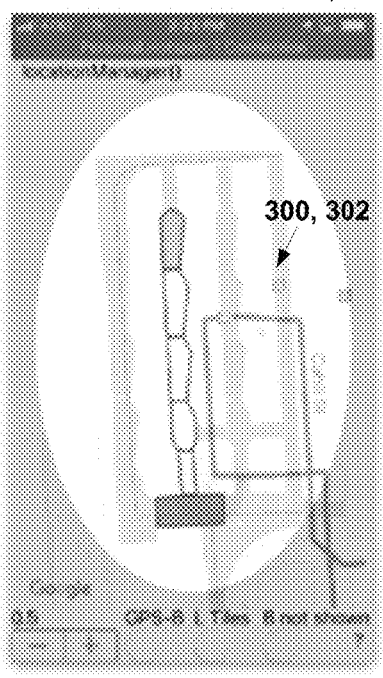
FIGS. 3C and 3D. Sample screenshots taken during a test of the RouteMe2 application at the Cahill bus stop, according to one or more embodiments of the present invention, wherein FIG. 3C RouteMe2 defines a set of tiles and local route from the current user's location (green tile) to the correct boarding location (red tile)
Figure 3D:
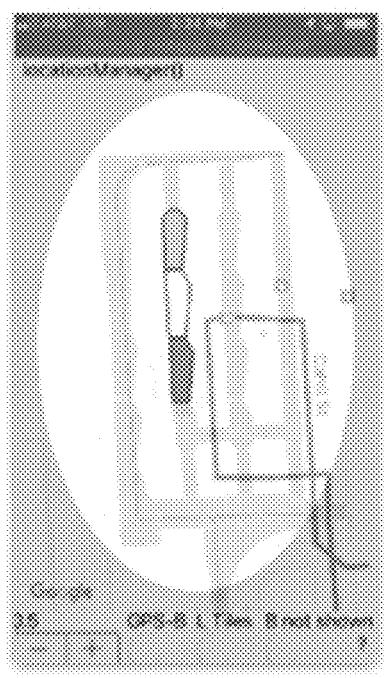

Block 102 represents determining the boarding tile for any given trip. FIGS. 2C and 2D illustrate the example of the Diridon light rail station, wherein the boarding tile is on the East platform for North-bound trains, and on the West platform for South-bound trains. FIGS. 3C and 3D illustrate the example of the Cahill bus hub, showing the boarding tile depends on the bus line used for that trip. In one or more examples, this information is not directly available from GTFS files or from Google Direction API, and needs to be "mined" from other sources.

Block 104 represents computing and continuously updating a local route from the tile where the traveler is currently located to the boarding tile. The local route is highlighted on the map shown on the phone. It can be used by the traveler at the transit stop to determine in which direction to walk to reach the boarding tile. For visually impaired users, the route could be expressed via synthetic speech, using specific directions and landmarks for orientation. For locations where GPS is unavailable (e.g. subways, underground passages) or unreliable (e.g. Diridon light rail station), BLE (Bluetooth low energy) beacons can be employed for improved estimation and tracking of the user's location.

In one or more embodiments, the system can be extended so as to cover the whole station, including train platforms, public areas, and underground passages.

Second Example

Method for Creating a Route

Figure 4:
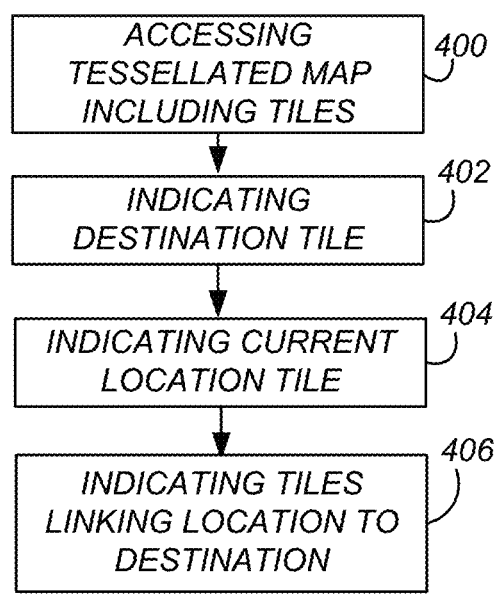
FIG. 4. Flowchart illustrating a method of creating a route for navigating a transport hub or plaza, according to one or more embodiments of the present invention.

FIG. 4 is a flowchart illustrating a method creating a route for navigating a transit hub or plaza using an application executing on a user's mobile device.

Block 400 represents accessing a tessellated map, the tessellated map comprising tiles on a map of the transit hub or the plaza, wherein the tiles comprise:
  (1) first tiles (e.g., destination or finish tiles), each of the first tiles including a different area of interest on the map; and
  (2) second tiles, wherein a plurality of the second tiles include a walkable area connecting the different areas of interest.

Block 402 represents indicating (e.g., highlighting on a display or through verbal cues) one of the first tiles (destination tiles) including one of the different areas of interest selected using input from the user.

Block 404 represents indicating (e.g., highlighting on a display or through verbal cues) one of the second tiles (e.g., start tile) including a current location of the mobile device on the map. In one or more examples, processors determine a location of a user using a beacon or GPS and mark the location on the map using one or more of the tiles. Destination tiles and start tiles can be highlighted in different colors, for example.

Block 406 represents indicating (e.g., highlighting on a display or verbal instructions) a series of the second tiles linking the current location to the one of the areas of interest.

Third Example

Method for Creating Tiles

Figure 5:
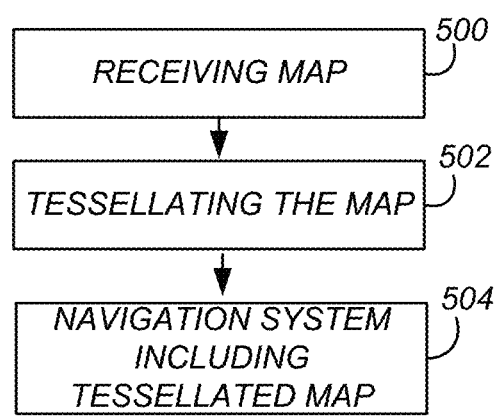
FIG. 5. Flowchart illustrating a method of creating tiles for use in a navigation system, according to one or more embodiments of the present invention.

FIG. 5 is a flowchart illustrating a method for creating tiles for a navigating a transit hub or plaza on a computer.

Block 500 represents receiving a map of the transit hub or the plaza, the map comprising a plurality of areas of interest in the transit hub or the plaza and a walkable area connecting the areas of interest.

Block 502 represents tessellating the map to form a plurality of tiles on the map. The tiles comprise:

(1) first tiles (e.g., destination tiles), each of the first tiles including a different one of the areas of interest; and
  (2) a plurality of second tiles including the walkable area.

The tiles are arranged so that a series of the tiles including one of the first tiles and a plurality of the second tiles can be linked so as to highlight or indicate a route from one of the second tiles (including a user's location on the map) to one of the first tiles including one of the different areas of interest selected by the user.

Block 504 represents the end result, a computer implemented navigation system comprising one or more processors; one or more memories; and one or more programs stored in the one or more memories, wherein the one or more programs executed by the one or more processors (1) receive a map of a transit hub or plaza, the map comprising a plurality of areas of interest in the transit hub or plaza and a walkable area connecting the areas of interest; and (2) tessellate the map to form a plurality of tiles on the map, so that a series of the tiles including one of the first tiles and a plurality of the second tiles can be linked so as to indicate a route from one of the second tiles including a user's location on the map to one of the first tiles including one of the areas of interest selected by the user.

Fourth Example

Linking with Another Navigation System

A first navigation system according to embodiments described herein (e.g., according to the First, Second, or Third Examples) can be linked in or integrated with another second navigation system (e.g., Google Maps, Apple Maps, Waze). The second navigation system can be used to navigate the user to the facility, plaza or the transit hub, but cannot provide navigation within the facility, plaza, or transit hub, or within a station (e.g., within a train station, within a subway station, or within a bus station that may or may not be inside a transit hub). The second navigation system provides navigation to the entrance to the facility, plaza, or transit hub and links to the first navigation system, so that the user can use the first navigation system to navigate from the entrance (identified using information provided by the second navigation system) to the destination tile (e.g., boarding tile). In one or more examples, the entrance may be a disembarkation platform (e.g., from a train) and the destination tile may be another departure platform (e.g., subway platform) so that the first navigation system enables navigation during a transfer between a train and a subway.

A. In one or more further examples, a first navigation system according to methods and systems described herein is linked or integrated to another second navigation system having sufficiently fine grain information to navigate the user between stations (e.g., between a train station, a subway station, or bus station) but the second navigation system does not know the platform on which the user will exit from or catch the train, bus, or subway. The second navigation system receives information from the first navigation system so that the second navigation system can define the "first tile" or destination tile (where to board the subway) and thus the route to it. For example, the first navigation system may receive or determine the boarding area using data on a server computer (e.g. operated by a transit hub), the data comprising information on the boarding area associated with a transport route serving the destination from the station, and communicates this information to the second navigation system so that the second navigation system can generate a route to the appropriate boarding area. In one or more further examples, the first navigation system generates a verbal signal identifying the tile including the user's current location with respect to a relevant landmark, and a verbal instruction providing a direction to the next tile in the series of the tiles leading to the area of interest.

Fifth Example

Tile Dimensions

Tiles can have variable size. In one or more examples, tiles are sized so as to define, differentiate, and/or generate relationship between areas that intersect. In yet further examples, tiles are sized so as to define, differentiate, and/or relate different areas suitable for different certain purposes. For example, on a train platform, a single tile can be defined to represent a tile for an area that has a shelter, and another tile can be assigned to represent the area outside of the shelter In further examples, a tile is a spatial unit such that it is not necessary to know the exact location of the user within the tile. For example, a single tile can represent a stretch of corridor between two doors (e.g., wherein the tile ends at each door, or wherein the tile ends at each point where there is an intersection between corridors).

In one or more examples, each tile has a length between 5 and 20 meters, or an area in a range of 5 meters by 5 meters to 20 meters by 20 meters.

Nomenclature

In one or more examples, a walkable area is defined to includes areas that can be accessed and traversed by the disabled, elderly, or children. For example, a walkable area can be defined as an area accessible and traversable using wheelchairs and/or strollers and/or crutches and/or walkers. In other examples, a walkable area is defined as a pedestrian zone, e.g., an area that cars or other motorized vehicles are prohibited from using. In yet further examples, a walkable area is defined by regulations of the facility (plaza or transit hub) that allow and disallow various modes of movement or transportation (e.g., motorized vehicles, scooters, bicycles) in that area. In yet further examples, the route is created so that (or so the user of the route is informed that) the user can complete the whole route in the mode (e.g., on foot, wheelchair, bicycle) being utilized by the user.

Sixth Example

Hardware Environment

Figure 6:
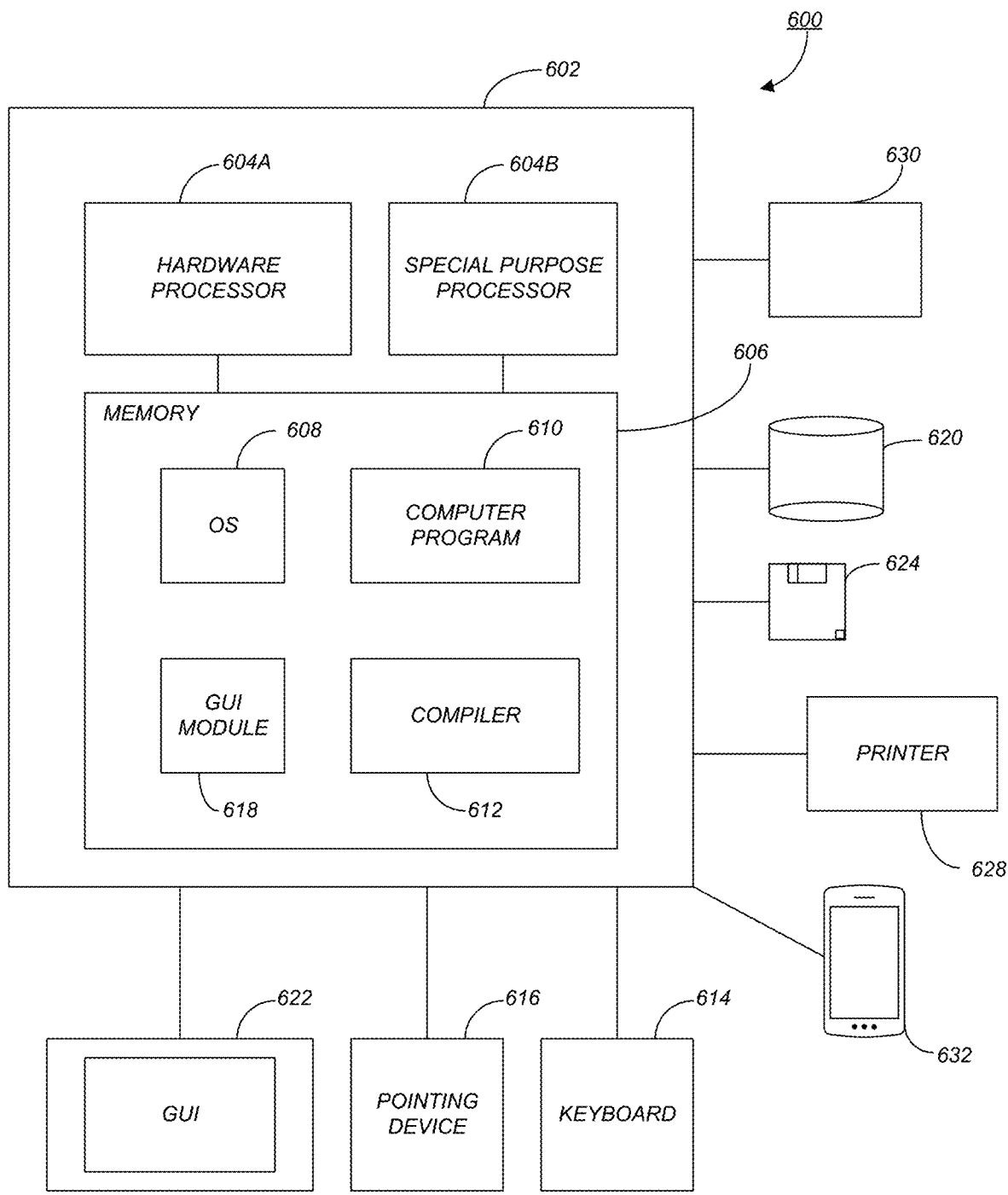
FIG. 6. Example hardware environment for implementing the methods described herein.

FIG. 6 is an exemplary hardware and software environment 600 (referred to as a computer-implemented system and/or computer-implemented method) used to implement one or more embodiments of the invention. The hardware and software environment includes a computer 602 and may include peripherals. Computer 602 may be a user/client computer, server computer, or may be a database computer. The computer 602 comprises a hardware processor 604A and/or a special purpose hardware processor 604B (hereinafter alternatively collectively referred to as processor 604) and a memory 606, such as random access memory (RAM). The computer 602 may be coupled to, and/or integrated with, other devices, including input/output (I/O) devices such as a keyboard 614, a cursor control device 616 (e.g., a mouse, a pointing device, pen and tablet, touch screen, multi-touch device, etc.) and a printer 628. In one or more embodiments, computer 602 may be coupled to, or may comprise, a portable or media viewing/listening device 632 (e.g., an MP3 player, IPOD, NOOK, portable digital video player, cellular device, personal digital assistant, etc.). In yet another embodiment, the computer 602 may comprise a multi-touch device, mobile phone, gaming system, internet enabled television, television set top box, or other internet enabled device executing on various platforms and operating systems.

In one embodiment, the computer 602 operates by the hardware processor 604A performing instructions defined by the computer program 610 under control of an operating system 608. The computer program 610 and/or the operating system 608 may be stored in the memory 606 and may interface with the user and/or other devices to accept input and commands and, based on such input and commands and the instructions defined by the computer program 610 and operating system 608, to provide output and results.

Output/results may be presented on the display 622 or provided to another device for presentation or further processing or action. In one embodiment, the display 622 comprises a liquid crystal display (LCD) having a plurality of separately addressable liquid crystals. Alternatively, the display 622 may comprise a light emitting diode (LED) display having clusters of red, green and blue diodes driven together to form full-color pixels. Each liquid crystal or pixel of the display 622 changes to an opaque or translucent state to form a part of the image on the display in response to the data or information generated by the processor 604 from the application of the instructions of the computer program 610 and/or operating system 608 to the input and commands. The image may be provided through a graphical user interface (GUI) module 618. Although the GUI module 618 is depicted as a separate module, the instructions performing the GUI functions can be resident or distributed in the operating system 608, the computer program 610, or implemented with special purpose memory and processors.

In one or more embodiments, the display 622 is integrated with/into the computer 602 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 602 according to the computer program 610 instructions may be implemented in a special purpose processor 604B. In this embodiment, some or all of the computer program 610 instructions may be implemented via firmware instructions stored in a read only memory (ROM), a programmable read only memory (PROM) or flash memory within the special purpose processor 604B or in memory 606. The special purpose processor 604B may also be hardwired through circuit design to perform some or all of the operations to implement the present invention. Further, the special purpose processor 604B may be a hybrid processor, which includes dedicated circuitry for performing a subset of functions, and other circuits for performing more general functions such as responding to computer program 610 instructions. In one embodiment, the special purpose processor 604B is an application specific integrated circuit (ASIC).

The computer 602 may also implement a compiler 612 that allows an application or computer program 610 written in a programming language such as C, C++, Assembly, SQL, PYTHON, PROLOG, MATLAB, RUBY, RAILS, HASKELL, or other language to be translated into processor 604 readable code. Alternatively, the compiler 612 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 610 accesses and manipulates data accepted from I/O devices and stored in the memory 606 of the computer 602 using the relationships and logic that were generated using the compiler 612.

The computer 602 also optionally comprises an external communication device such as a modem, satellite link, Ethernet card, or other device for accepting input from, and providing output to, other computers 602.

In one embodiment, instructions implementing the operating system 608, the computer program 610, and the compiler 612 are tangibly embodied in a non-transitory computer-readable medium, e.g., data storage device 620, which could include one or more fixed or removable data storage devices, such as a zip drive, floppy disc drive 624, hard drive, CD-ROM drive, tape drive, etc. Further, the operating system 608 and the computer program 610 are comprised of computer program 610 instructions which, when accessed, read and executed by the computer 602, cause the computer 602 to perform the steps necessary to implement and/or use the present invention or to load the program of instructions into a memory 606, thus creating a special purpose data structure causing the computer 602 to operate as a specially programmed computer executing the method steps described herein. Computer program 610 and/or operating instructions may also be tangibly embodied in memory 606 and/or data communications devices 630, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 602.

Figure 7:
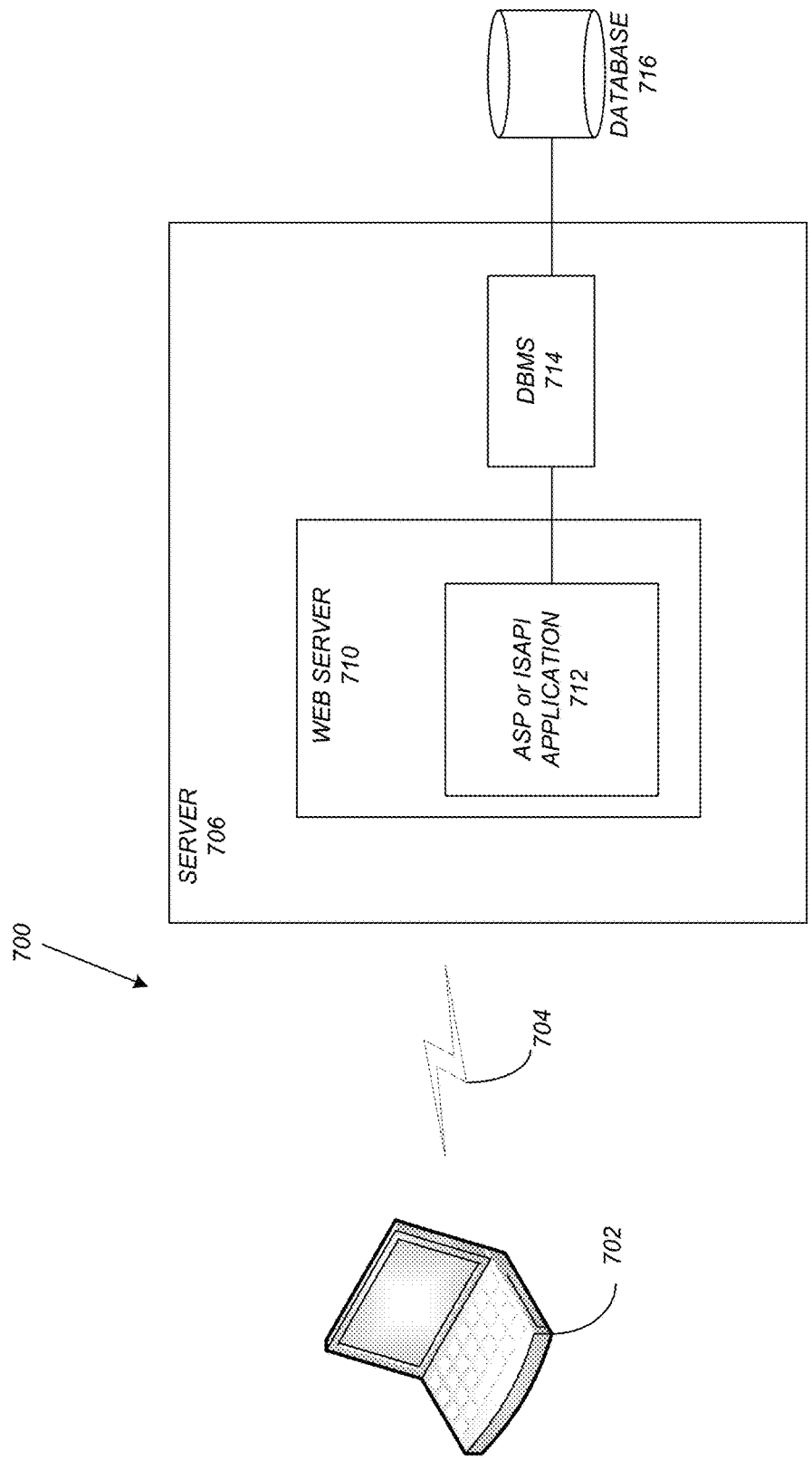
FIG. 7. Example communications network linking a server (e.g., cloud computer) to a mobile device so as to implement the methods described herein.

FIG. 7 schematically illustrates a typical distributed/cloud-based computer system 700 using a network 704 to connect client computers 702 to server computers 706. A typical combination of resources may include a network 704 comprising the Internet, LANs (local area networks), WANs (wide area networks), SNA (systems network architecture) networks, or the like, clients 702 that are personal computers or workstations (as set forth in FIG. 6), and servers 706 that are personal computers, workstations, minicomputers, or mainframes (as set forth in FIG. 6). However, it may be noted that different networks such as a cellular network (e.g., GSM [global system for mobile communications] or otherwise), a satellite based network, or any other type of network may be used to connect clients 702 and servers 706 in accordance with embodiments of the invention.

A network 704 such as the Internet connects clients 702 to server computers 706. Network 704 may utilize ethernet, coaxial cable, wireless communications, radio frequency (RF), etc. to connect and provide the communication between clients 702 and servers 706. Further, in a cloud-based computing system, resources (e.g., storage, processors, applications, memory, infrastructure, etc.) in clients 702 and server computers 706 may be shared by clients 702, server computers 706, and users across one or more networks. Resources may be shared by multiple users and can be dynamically reallocated per demand. In this regard, cloud computing may be referred to as a model for enabling access to a shared pool of configurable computing resources.

Clients 702 may execute a client application or web browser and communicate with server computers 706 executing web servers 710. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 702 may be downloaded from server computer 706 to client computers 702 and installed as a plug-in or ACTIVEX control of a web browser. Accordingly, clients 702 may utilize ACTIVEX components/component object model (COM) or distributed COM (DCOM) components to provide a user interface on a display of client 702. The web server 710 is typically a program such as MICROSOFT'S INTERNET INFORMATION SERVER.

Web server 710 may host an Active Server Page (ASP) or Internet Server Application Programming Interface (ISAPI) application 712, which may be executing scripts. The scripts invoke objects that execute business logic (referred to as business objects). The business objects then manipulate data in database 716 through a database management system (DBMS) 714. Alternatively, database 716 may be part of, or connected directly to, client 702 instead of communicating/obtaining the information from database 716 across network 704. When a developer encapsulates the business functionality into objects, the system may be referred to as a component object model (COM) system. Accordingly, the scripts executing on web server 710 (and/or application 712) invoke COM objects that implement the business logic. Further, server 706 may utilize MICROSOFT'S TRANSACTION SERVER (MTS) to access required data stored in database 716 via an interface such as ADO (Active Data Objects), OLE DB (Object Linking and Embedding DataBase), or ODBC (Open DataBase Connectivity).

Generally, these components 700-716 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 702 and 706 may be interchangeable and may further include thin client devices with limited or full processing capabilities, portable devices such as cell phones, notebook computers, pocket computers, multi-touch devices, and/or any other devices with suitable processing, communication, and input/output capability. Embodiments of the invention are implemented as a software/application on a client 602 or server computer 706. Further, as described above, the client 602 or server computer 706 may comprise a thin client device or a portable device that has a multi-touch-based display.

Of course, those skilled in the art will recognize that any combination of the above components, or any number of different components, peripherals, and other devices, may be used with computers 702 and 706.

One more embodiments may use Application Programming Interfaces (APIs) such as, but not limited to, Google Maps JavaScript API, Google Maps Directions API, Google Maps Distance Matrix API, and Google Maps Roads API.

In one or more examples, the web application is developed in Flask and the client application runs on iOS.

Software Embodiment Overview

Embodiments of the invention are implemented as a software application on a client 702 or server computer 706. Further, as described above, the client 702 or server computer 706 may comprise a thin client device or a portable device that has a multi-touch-based display.

Advantages and Improvements

Many travelers get confused when moving in complex transit hubs, especially if they have visual or cognitive impairments. A system according to embodiments illustrated herein and implemented as a smartphone app can simplify navigation, ensuring that the user can make it to destination (e.g. a train platform, the station exit) by following local routing directions.

Typical navigation systems generate routes at relatively large scales. They are unable, for example, to direct their user to a specific bus stop location in a multi-platform stop, or to the correct train platform. Besides the use of virtual tiles for routing, a key feature of the systems illustrated herein is that it automatically determines the "boarding tile" (the tile the user needs to be in when boarding a bus vehicle or train cart) based on the trip routing information (which can be obtained using services such as Google Direction API or OpenTripPlanner). User localization can be obtained using GPS or other systems, such as iBeacons.

System and Method Embodiments

FIGS. 1-7 illustrate the systems or methods described herein can be embodied in many ways including, but not limited to, the following (reference numbers in text referring to corresponding parts in the figures).

1. A computer implemented method comprising,
creating a route 200 for navigating a transit hub 202 or plaza 300 using an application executing on a user's mobile device, including:
accessing a tessellated map 204, the tessellated map comprising tiles 206 on a map 208 of the transit hub or the plaza, wherein the tiles comprise
first tiles 210, each of the first tiles including a different area of interest 210a on the map; and
second tiles 212, wherein a plurality of the second tiles include a walkable area connecting the different areas of interest;
indicating one 214 of the first tiles including one of the different areas of interest selected using input from the user;
indicating one 216 of the second tiles including a location 218 of the mobile device on the map; and
indicating a series 220 of the second tiles linking the location to the one of the different areas of interest.
2. The method of example 1, wherein the areas of interest comprise at least one area selected from a boarding area 222, a ticketing area, a ticket checking area, a crossing area, a shelter area, and an exit area.

3. The method of any of the preceding examples, wherein:
the creating further comprises requesting a destination served using a departure from a boarding area in the transit hub; and
the one of the different areas of interest comprises the boarding area.
4. The method of any of the preceding examples, wherein the creating further comprises:
receiving or determining the boarding area using data on a server computer coupled to the mobile device, the data comprising information on the boarding area associated with a transport route serving the destination from the transit hub (e.g., comprising a railway station 250 or bus station 302).
5. The method of example 4, wherein the transport route is a bus route, a railway route, a taxi route, or a flight route.
6. The method of any of the preceding examples, wherein the indicating comprises indicating the one of second tiles including the location of the user as the user moves in relation to the one of the different areas of interest.
7. The method of any of the preceding examples, wherein the indicating comprises highlighting using a color 224.
8. The method of any of the preceding examples, wherein the indicating comprises highlighting 226 using a representation readable by the user comprising a visually impaired user.
9. The method of any of the preceding examples, wherein the indicating comprises causing the mobile device to output:
a verbal signal identifying the second tile including the user's current location with respect to a relevant landmark, and
a verbal instruction providing a direction to the next tile in the series of the tiles leading to the area of interest.
10. The method of any of the preceding examples, wherein the tiles are sized to represent an area in the transit hub or plaza in a range of 1 foot by 1 foot to 10 feet by 10 feet.
11. The method of any of the preceding examples, wherein the tiles are sized so that an entirety of the route is highlighted using the tiles on a display of the mobile device.
12. The method of any of the preceding examples, wherein:
the tiles comprise shapes or polygons, and
the tessellated map comprises the tiles fitted together in a pattern on the map without gaps or overlapping between the tiles.
13. The method of any of the preceding examples, further comprising determining the location using a global positioning system (GPS) or a beacon signal received in the mobile device.
14. The method of example 13, wherein the beacon signal is transmitted from one of a plurality of transmitters in the transit hub or the plaza.
15. The method of any of the preceding examples, wherein the creating further comprises:
receiving the tessellated map from a server computer in response to a request from the application executed on the mobile device.
16. The method of any of the preceding examples, wherein:
the plaza comprises a shopping mall, a hospital, office buildings, or a factory, or
the transit hub comprises an airport, metro station, railway station, or bus station.

17. A computer implemented system 600, comprising:
one or more processors; one or more memories; and an application, instructions, or program stored in the one or more memories, wherein the application, instruction, or program executed by the one or more processors:
accesses a tessellated map 204, the tessellated map comprising a plurality of tiles 206 on a map 208 of the transit hub 202, wherein the tiles comprise:
first tiles 210, each of the first tiles including a different area of interest 210*a* on the map; and
second tiles 212, wherein a combination of the second tiles includes a walkable area connecting the areas of interest; and
causes a display 350, 632 of a mobile device coupled to the one or more processors to
indicate one of the first tiles including one of the different areas of interest selected using input from the user;
indicate (using an indicator or map annotator 214) the one of the second tiles including a location of the mobile device on the map; and
indicate (using indicator or map annotator) a series 220 of the second tiles linking the location to the one of the areas of interest.

18. The system of example 17, wherein the application requests input of the areas of interest comprising at least one area selected from a boarding area, a ticketing area, a ticket checking area, a crossing area, a shelter area, and an exit area.

19. The system of examples 17 or 18, wherein:
the application requests a destination served using a departure from a boarding area in the transit hub; and
the one of the different areas of interest comprises the boarding area.

20. The system of example 19, wherein the application receives or determines the boarding area using data on a server computer coupled to the mobile device, the data comprising information on the boarding area associated with a transport route serving the destination from the transit hub.

21. The system of example 20, wherein the transport route is a bus route, a railway route, a taxi route, or a flight route.

22. The system of any of the examples 17-21, wherein the display or speaker indicates the one of second tiles including the location of the user as the user moves in relation to the one of the different areas of interest.

23. The system of any of the examples 17-22, wherein the display indicates the tiles on the display using a color.

24. The system of any of the examples 17-23, wherein the display indicates the tiles using highlighting or a representation readable by the user comprising a visually impaired user.

25. The system of any of the examples 17-24, wherein the application causes the speaker of the mobile device to output:
a verbal signal identifying the second tile including the user's current location with respect to a relevant landmark, and
a verbal instruction providing a direction to the next tile in the series of the tiles leading to the area of interest.

26. The system of any of the examples 17-25, wherein the tiles on the display are sized to represent an area in the transit hub or plaza in a range of 1 foot by 1 foot to 10 feet by 10 feet.

27. The system of any of the examples 17-26, wherein the tiles are sized so that an entirety of the route is highlighted using the tiles on a display of the mobile device.

28. The system of any of the examples 17-27, wherein:
the tiles on the display comprise shapes or polygons, and
the tessellated map comprises the tiles fitted together in a pattern on the map without gaps or overlapping between the tiles.

29. The system of any of the examples 17-28, further comprising the mobile device determining the location using a global positioning system (GPS) or a beacon signal received in the mobile device.

30. The system of any of the examples 17-29, further comprising the mobile device receiving the beacon signal transmitted from one of a plurality of transmitters in the transit hub or the plaza.

31. The system of any of the examples 17-30, wherein the application receives the tessellated map from a server computer in response to a request from the application executed on the mobile device.

32. The system of any of the examples 17-31, wherein:
the plaza comprises a shopping mall, a hospital, office buildings, or a factory, or
the transit hub comprises an airport, metro station, railway station, or bus station.

33. A computer implemented method, comprising:
creating tiles 206 for a navigating a transit hub 202 or plaza 300 on a computer 600, including:
receiving 208 a map of the transit hub 202 or the plaza, the map comprising a plurality of areas of interest 210*a* in the transit hub or the plaza and a walkable area connecting the areas of interest; and
tessellating the map to form a plurality of tiles 206 on the map, wherein:
the tiles comprise:
first tiles 210, each of the first tiles including a different one of the areas of interest; and
second tiles 212 including the walkable area, and
a series 220 of the tiles including one of the first tiles and a plurality of the second tiles can be linked so as to indicate a route 200 from one of the second tiles including a user's location 218 on the map to one of the first tiles including one of the different areas of interest selected by the user.

34. A computer implemented system 600, comprising:
one or more processors; one or more memories; and one or more programs stored in the one or more memories, wherein the one or more programs executed by the one or more processors:
receive a map 208 of a transit hub or plaza, the map comprising a plurality of areas of interest in the transit hub or plaza and a walkable area connecting the areas of interest; and
tessellate the map to form a plurality of tiles on the map, wherein:
the tiles comprise:
first tiles 210, each of the first tiles including a different one of the areas of interest; and
a plurality of second tiles 212 including the walkable area, and
a series 220 of the tiles including one of the first tiles and a plurality of the second tiles can be linked so as to indicate a route 200 from one of the second tiles including a user's location 218 on the map to one of the first tiles including one of the areas of interest selected by the user.

35. The method or system of any of the examples 17-34, wherein the tiles are represented in a Geo-JSON format.

36. The system of any of the examples 17-35, wherein the one or more memories and the one or more processors are in a server computer.

37. A computer implemented system of any of the preceding examples, comprising components stored in the memory that are executed by the processor comprising a map annotator (e.g., highlighted tiles) that annotates the map and provides the instructions to a display component or speaker component of the mobile device to create or generate the highlighting or indicating of the tiles; and a navigation component that extracts/receives data used by the map annotator to indicate the tiles.

38. The computer implemented system or method of any of the preceding examples, comprising activating or utilizing the map in real-time to provide navigation instructions in a real-world environment.

39. A navigation system or application or mapping system or application comprising the system of any of the examples 17-38 or using method of any of the examples 1-16.

In various examples, the methods and systems described herein are integrated into a practical application (e.g., computer implemented mapping system or navigation system) and improve functioning of the mapping system, navigation system, and/or computers implementing the mapping or navigation system.

CONCLUSION

This concludes the description of the preferred embodiment of the present invention. The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer implemented navigation system, comprising:
a mobile device comprising a display, a speaker, and one or more processors; one or more memories; and a navigation application stored in the one or more memories, wherein the navigation application executed by the one or more processors:
accesses a tessellated map, the tessellated map comprising a plurality of tiles on a map of a transit hub or plaza, wherein the tiles comprise:
first tiles, each of the first tiles including a different area of interest within a walkable area of the transit hub or plaza on the map; and
second tiles, wherein a combination of the second tiles includes the walkable area connecting the areas of interest; and
causes the display or the speaker of the mobile device coupled to the one or more processors to:
indicate one of the first tiles with at least one of a first color or a first verbal signal, wherein each of the first tiles is a first type of single tile shaped and sized to define, and differentiate a different purpose of, one of the different areas of interest so that the tiles adjacent the first type of the single tile having the different purpose are outside the one of the different areas of interest;
indicate, with at least one of a second color or a second verbal signal, one of the second tiles including a location of the mobile device on the map;
indicate, using at least one of a colored highlighting or a third verbal signal, a series of the second tiles linking the location to the one of the areas of interest along a route; and
identify the one of second tiles with respect to a relevant landmark using a fourth verbal signal to aid with orientation; and
the application requests a destination served using a departure from a boarding area in the transit hub; and
the navigation application automatically determines and indicates the one of the first tiles, comprising the boarding area, using data on a server computer coupled to the mobile device, the data comprising information on the boarding area associated with a transport route serving a destination from the transit hub.

2. The system of claim 1, wherein the application requests input of the areas of interest comprising at least one area selected from the boarding area, a ticketing area, a ticket checking area, a crossing area, a shelter area, and an exit area, further comprising a second navigation system linked in or integrated with the navigation system, wherein the second navigation system navigates the user to an entrance to the transit hub, from outside the transit hub, and the application automatically defines the entrance as one of the second tiles.

3. The system of claim 1, wherein:
the navigation application determines and indicates the tiles represented in a Geo-JSON format.

4. The system of claim 3, wherein the transport route is a bus route, a railway route, a taxi route, or a flight route.

5. The system of claim 1, wherein the application indicates the one of second tiles including the location of a user as the user moves in relation to the one of the different areas of interest.

6. The system of claim 1, wherein:
the different areas of interest comprise at least one area selected from the boarding area, a ticketing area, a ticket checking area, a crossing area, a shelter area; and
the one of the second tiles is a second type of single tile sized and colored to define a location area having a certain purpose so that the tiles adjacent the second type of single tile are differentiated as not having the certain purpose.

7. The system of claim 1, wherein the application causes the speaker of the mobile device to output:
the second verbal signal identifying the second tile including the user's current location with respect to the relevant landmark, and
the third verbal signal comprises a verbal instruction providing a direction to a next tile in the series of the second tiles leading to the one of the areas of interest.

8. The system of claim 1, wherein the application sizes the tiles on the display to represent an area in the transit hub or plaza in a range of 1 foot by 1 foot to 10 feet by 10 feet.

9. The system of claim 1, wherein:
each of the second tiles is a second type of single tile sized and colored to define an area having a certain purpose so that tiles adjacent the second type of single tile are differentiated as not having the certain purpose, and/or the tiles are sized so that an entirety of the route is highlighted using the tiles on a display of the mobile device.

10. The system of claim 1, wherein:
the tiles comprise shapes or polygons, and
the tessellated map comprises the tiles fitted together in a pattern on the map without gaps or overlapping between the ties.

11. The system of claim 1, wherein the application receives the location determined using a global positioning system (GPS) or a beacon signal received in the mobile device.

12. The system of claim 11, further comprising the mobile device receiving the beacon signal transmitted from one of a plurality of transmitters in the transit hub or the plaza.

13. The system of claim 1, wherein the application receives the tessellated map from a server computer in response to a request from the application executed on the mobile device.

14. The system of claim 1, wherein:
the plaza comprises a shopping mall, a hospital, office buildings, or a factory, or
the transit hub comprises an airport, metro station, railway station, or bus station.

15. A computer implemented navigation system, comprising:
a mobile device comprising a display and one or more processors; one or more memories; and a navigation application stored in the one or more memories, wherein the navigation application executed by the one or more processors:
accesses a tessellated map, the tessellated map comprising a plurality of tiles on a map of a transit hub or plaza, wherein the tiles comprise:
first tiles, wherein each of the first tiles is a single tile sized to define an area of interest on the map, so that tiles adjacent the single tile are outside the area of interest; and
second tiles, wherein a combination of the second tiles includes a walkable area connecting the areas of interest; and
causes the display coupled to the one or more processors to:
indicate, using a first color, one of the first tiles including one of the different areas of interest selected using input from a user;
indicate, using a second color, one of the second tiles including a location of the mobile device on the map; and
indicate a route using a series of the second tiles linking the location to the one of the areas of interest; and
wherein the application indicates the tiles on the display using highlighting readable by the user comprising a visually impaired user or a representation readable by the user comprising a visually impaired user, including updating the highlighting of the second tiles as the mobile device moves along the route so that only the one of the second tiles including the location of the mobile device is highlighted with the second color.

16. A computer implemented method, comprising:
creating a route for navigating a transit hub or plaza using a navigation application executing on a user's mobile device, including:
accessing a tessellated map, the tessellated map comprising tiles on a map of a transit hub or a plaza, wherein the tiles comprise:
first tiles, each of the first tiles including a different area of interest on the map; and
second tiles, wherein a plurality of the second tiles include a walkable area connecting the different areas of interest;
indicating one of the first tiles with a first color, wherein each of the first tiles is a first type of single tile sized and colored to define one of the different areas of interest selected from a boarding area, a ticketing area, a ticket checking area, a crossing area, a shelter area, or an exit area, so that the tiles adjacent the first type of single tile are differentiated as being outside the one of the different areas of interest;
indicating, with a second color, one of the second tiles including a location of the mobile device on the map wherein each of the second tiles is a second type of single tile sized and colored to define an area having a certain purpose so that tiles adjacent the second type of single tile are differentiated as not having the certain purpose;
indicating, using a colored highlighting, a series of the second tiles linking the location to the one of the different areas of interest;
identifying the one of the second tiles with respect to a relevant landmark to aid with orientation;
requesting a destination served using a departure from the boarding area in the transit hub; and
automatically determining and indicating the one of the first tiles, comprising the boarding area, using data on a server computer coupled to the mobile device, the data comprising information on the boarding area associated with a transport route serving a destination from the transit hub.

17. The method of claim 16, wherein the indicating comprises highlighting the one of second tiles including the location of the user as the user moves in relation to the one of the different areas of interest, including updating the highlighting of the second tiles as the mobile device moves along the route so that only the one of the second tiles including the location of the mobile device is highlighted with the second color.

18. The method of claim 16, wherein the navigation application determines and indicates the tiles represented in a Geo-JSON format.

19. The method of claim 16, wherein the indicating comprises the highlighting readable by the user comprising a visually impaired user or using a representation readable by the user comprising a visually impaired user.

20. The system of claim 1, wherein each tile having a meaning or comprising a landmark is accompanied with a description for use by a user comprising a blind traveler.

* * * * *